United States Patent [19]
Foster et al.

[11] Patent Number: 5,379,032
[45] Date of Patent: Jan. 3, 1995

[54] IMPULSE TRANSDUCER ENUNCIATOR

[75] Inventors: Jewett E. Foster, Elgin; Theodore Lind, Lombard, both of Ill.; Charles W. Mooney, Lake Worth; Irving H. Holden, Boca Raton, both of Fla.

[73] Assignee: Motorola, Inc., Schaumburg, Ill.

[21] Appl. No.: 970,367

[22] Filed: Nov. 2, 1992

[51] Int. Cl.$^6$ .......................... H04Q 1/30; G08B 5/22
[52] U.S. Cl. ........................ 340/825.46; 340/311.1; 335/230
[58] Field of Search ............. 340/825.46; 381/171, 381/192; 310/23, 15

[56] References Cited

U.S. PATENT DOCUMENTS

| | | | |
|---|---|---|---|
| 4,259,653 | 3/1981 | McGonigal | 335/230 |
| 4,638,193 | 1/1987 | Jones | 310/15 |
| 5,107,540 | 4/1992 | Mooney et al. | 381/192 |
| 5,172,092 | 12/1992 | Nguyen et al. | 340/311.1 |

OTHER PUBLICATIONS

Duff, Lewis, Mendenhall, Carman and Knipp "Physics for Students of Science and Engineering" 1926 pp. 396-397.

*Primary Examiner*—Donald J. Yusko
*Assistant Examiner*—Lawrence O. Richardson
*Attorney, Agent, or Firm*—Gary J. Cunningham; Joseph P. Krause

[57] ABSTRACT

An impulse transducer that does not use eccentric, motor-driven weights is constructed of a permanent magnet movable armature that oscillates within a housing and impacts resilient bumpers to produce vibrations. The armature is accelerated by a varying magnetic field energized by an alternating current. The dimensions of the enclosed housing and the mass of the movable armature as well as the strength of the magnetic fields can be optimized for the impulse magnitude that is desired.

27 Claims, 1 Drawing Sheet

IMPULSE TRANSDUCER ENUNCIATOR

FIELD OF THE INVENTION

This invention relates to vibratory enunciators. More particularly this invention relates to vibratory enunciators particularly suited for use with radio communications devices

BACKGROUND OF THE INVENTION

Selective call receivers (also known as pagers) typically provide some sensory stimulus to a user upon receipt of a radio message addressed to the pager from a radio transmitter. This sensory stimulus is frequently an audible stimulus such as a beep or tone, but may also include some vibratory stimulus (vibration) that can be detected by the pager's user without having the pager emit an annoying or otherwise inappropriate audible response. Prior art vibratory transducers use a small electric motor-driven eccentric weight that sets up a vibration when the eccentric weight is spun by the motor.

In addition to being relatively expensive, these prior art vibratory transducers have a number of reliability problems including the wear on the motor bearings. Moreover, prior art motor-driven, vibratory transducers are frequently too large to be used in so-called credit card pagers because of their inherent thickness. In selective call receivers, vibratory enunciators that avoid the problems associated with prior art mechanisms would be an improvement over the prior art.

In other communications devices, such as cellular telephones and two-way radios, including both trunked and conventional radios, an audible ringer is typically used to provide a stimulus to the radio's user to urge the user to actuate the radio receiver in order to receive an incoming communication. In many of these other communications devices, a vibratory apparatus by which an incoming call can be alerted to the user might also be used in addition to or in place of a so called ringer. Where prior art motor-driven weights are used, a vibratory device that avoids prior art problems would be an improvement over the prior art.

Accordingly, an impulse transducer that avoids reliability and size problems associated with prior art motor-driven vibrators would be an improvement over the prior art.

DESCRIPTION OF A PREFERRED EMBODIMENT

Figure 1:
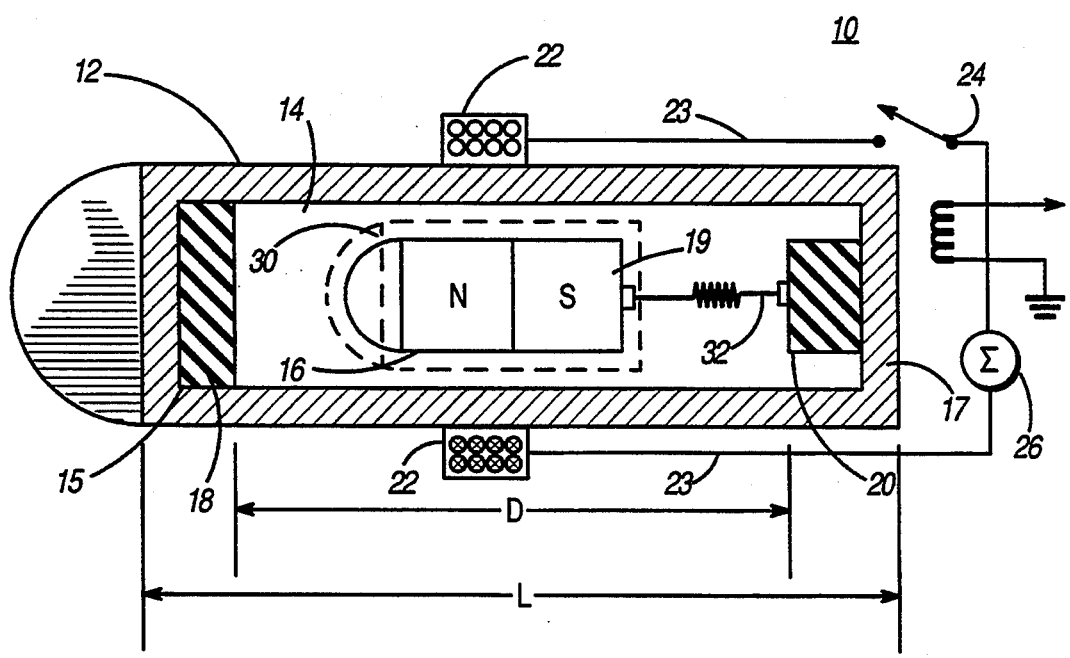
FIG. 1 shows a cut-away view of an impulse transducer.

FIG. 1 shows a cross-sectional view of a simplified impulse transducer that avoids the problems associated with prior art vibration transducers. In FIG. 1, the impulse transducer (10) is comprised of a housing (12) that encloses an interior volume (14). The enclosed volume (14) is considered to have first and second ends (15 and 17) at which there are located resilient bumpers (18 and 20) as shown. An armature (16), which is comprised of at least one permanent magnet (19) the poles of which are oriented to substantially align with the axis of the housing (12), is sized to fit within the enclosed volume (14) such that it is virtually free to move back and forth within the enclosed volume between the resilient bumpers (18 and 20).

The resilient bumpers (18 and 20) have thicknesses and are sized such that a distance D separates the bumpers; the distance D being the distance that the armature (19), which is a movable armature, is free to move between the bumpers (18 and 20). The composition of the bumpers (18 and 20) is not critical so long as they have a durometer that causes the armature (19) to rebound off the surface of a bumper when the armature impacts the bumper.

FIG. 1 also shows a cutaway of a coil (22) wound around the exterior of the housing (12) such that when the coil (22) is energized by an appropriate excitation signal (26) there is produced substantially throughout the volume (14) an oscillating magnetic field. The oscillating magnetic field acts to induce the translation or movement of the armature within the enclosed volume (14) between the bumpers (18 and 20). The excitation signal (26) is of course a signal supplying a signal of an appropriate waveform and current to the coil (22) that is capable of causing the armature (18) to displace rapidly between the bumpers (18 and 20) thereby causing the housing (12) to vibrate by the repeated impact of the armature (19) against the opposing rubber bumpers (18 and 20).

Repetitive impacts of the armature against the bumpers produce an impulse that is translated through the bumpers to the housing (12). This transmitted impact energy to the housing gives rise to the vibration of the housing. The intensity of the vibration is directly related to at least the velocity of the armature at the time of its impact and the mass of the armature itself. The length of the housing L, and the distance D that the armature is free to move will also have an effect on the magnitude of the impulse produced when the armature strikes either of the two bumpers (18 and 20). An additional weight, shown in broken lines and identified by reference numeral (30) might be attached or coupled to the armature magnet (19) to increase the magnitude of the impulse of the impact produced when the armature strikes the bumpers.

It can readily be seen in FIG. 1 that the impulse transducer (10) avoids the problems of the prior art associated with motor-driven eccentric weights. There are no bearings to wear out and the device itself can be made extremely thin and can in fact produce a greater intensity vibration signal than is possible with motor-driven eccentric weights. Alternate embodiments of the invention would include mounting the resilient bumpers (18 and 20) onto the armature (16) such that the bumpers move with the armature (18-1 and 20-1). Another alternate embodiment might include using bumpers on both the armature (16) and attached to the housing ( 18, 20, and 18-1, 20-1 ).

In some instances, it may be necessary to include the addition of a small spring (32), which in FIG. 1 is coupled to one side of the armature (19) and one of the bumpers (20) that acts to ensure the armature is never exactly in the mid-point of the magnetic field established by the coil (22). While a coil spring is depicted in FIG. 1, any means by which the armature is returned to an off-center starting location might be used instead of a coil. The spring (32) can be thought of as a parking mechanism that ensures the resting location of the armature (19) is at a location where application of a magnetic field from the coil (22) always is able to accelerate the armature into motion. In some instances, parking the armature in the center of the magnetic field exerted by the current in the coil might be able to move the armature if the attractive forces between the north and south poles of the armature and the poles created by the current in the coil are equal in magnitude and opposite in direction.

Using the structure shown in FIG. 1 of course requires that the material chosen for the housing (12) be magnetically permeable. Such a material might include any number of materials such as glass, plastics, or ceramics for example. Certain metals may also be appropriate for the housing (12) as well.

In the preferred embodiment it is preferable that the housing (12) as well as the enclosed volume (14) be substantially cylindrical but more planar housings might be used as well. As shown in FIG. 1, the cutaway of the housing (12) is that of a cylinder and it is believe to be a preferable shape. It is also preferable that the shape of the armature be that which is able to freely slide or translate through the housing in response to an applied magnetic field from the coil (22).

The bumpers (18 and 20) themselves are comprised of a compliant material, rubber for example, but any material having an appropriate durometer value would be acceptable. Materials having durometer values of substantially between 20 and 100 are believed to be preferable. Several different configurations for the armature might be usable. Different embodiments might contemplate using a plurality of a number of permanent magnets so long as their North/South facilitates acceleration of the armature by the induced magnetic field. Acceptable magnets might include those made of, for example, samarium cobalt, neodynium, or an alnico alloy.

Figure 2:
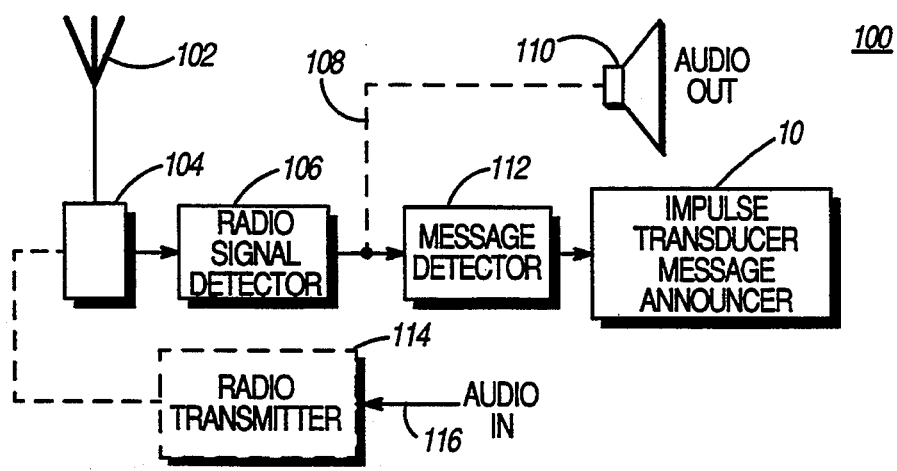
FIG. 2 shows a simplified block diagram of a radio communications device using an impulse transducer message announcer.

The application of the impulse transducer (10) shown in FIG. 1 would include use in both a pager (selective call receiver) or cellular telephone, or other two-way radio communications device. In FIG. 2, there is shown a simplified block diagram of a radio communications device (100). This radio communications device (100), when it includes the portions shown in broken lines, might be either a cellular telephone or either a two-way or conventional radio.

In FIG. 2, radio signals received at the antenna (102) are coupled into radio signal detector demodulator circuitry (106) and in the case of a cellular telephone might pass through a duplexer (104), all such devices being well known in the prior art. The radio signal detector/demodulator circuitry shown in FIG. 2 is representative of the circuitry that detects radio signals, filters them and demodulates them to a frequency at which embedded informational messages can be detected in a message detector circuit (112). A message detector most frequently is a single chip microcomputer or microprocessor the output of which is used to enable the impulse transducer (10), such as the impulse transducer shown in FIG. 1. In the case of a radio communications device that produces audible signals, the output of the radio signal detector/demodulator circuitry might be coupled (108) to the speaker device (110) by which audio signals can be heard by the user.

If the radio communications device shown in FIG. 2 is a cellular device or two-way radio for example a transmitter circuit (114) that is modulated by input audio (116) will be coupled to the antenna (102) through the multiplexer (104) which those skilled in the art will readily recognize.

In the radio communications device (100) shown in FIG. 2, the impulse transducer (10) which is shown in cross-section in FIG. 1, can be used to announce to the user of the radio communications device (100) the detection of an incoming message. Upon receipt of a message addressed to the device (100), the message detector can enable the impulse transducer message announcer (10), which is essentially the impulse transducer depicted in FIG. 1, to provide a vibratory stimulus indicating receipt of a message.

Those skilled in the art will recognize that the radio signal detector/demodulator might be discrete amplifier, filter, mixer, circuits and so forth. Such a radio signal detector might also be embodied in a digital signal processor for example. As was mentioned, the message detector most frequently will be a single chip computer or microprocessor or microcontroller but also might be a part of a suitable digital signal processor. The function of the message detector being principally to detect when messages that are addressed to the particular radio communications device (100) are received by the device from the antenna (102)

Figure 3:
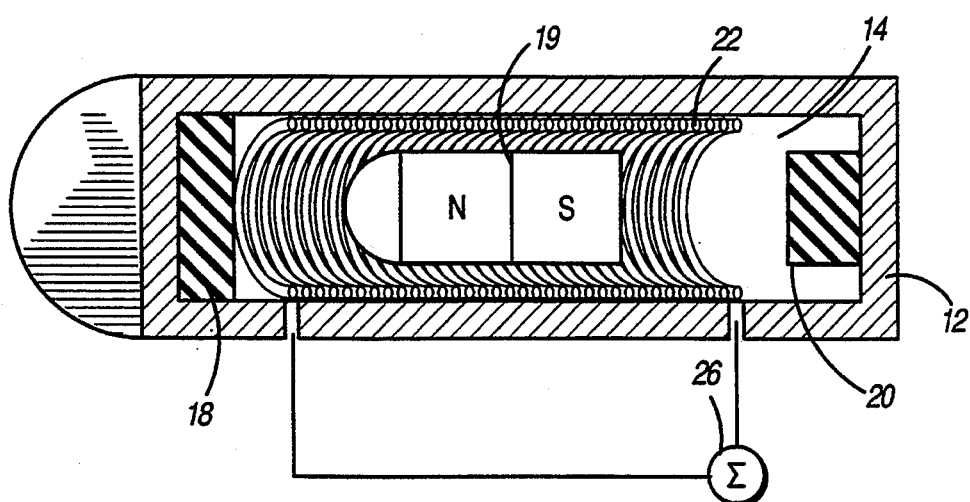
FIG. 3 shows an alternate embodiment of an impulse transducer.

FIG. 3 shows an alternate embodiment of the impulse transducer shown in FIG. 1 but using a slightly different coil geometry. In FIG. 3, the coil (22), which in FIG. 1 was on the exterior of the housing, is mounted within the interior of the housing within the enclosed volume (14). Moreover, the coil is distributed throughout the entire length of the enclosed volume (14) substantially between the two bumpers (18 and 20). The coil is otherwise the same in operation as that shown in FIG. 1 including the application of an appropriate excitation signal (26).

Using appropriately sized housings for the impulse transducer disclosed herein, problems associated with the prior art vibratory transducers can be avoided. Additionally, the device could be made small enough so as to fit within the size constraints associated with ultra-thin or so-called credit-card thickness paging devices. The increased reliability, reduced size, and reduced cost all represent improvements over the prior art.

What is claimed is:

1. An impulse transducer comprised:
   a housing having an enclosed substantially cylindrical volume, said enclosed volume having first and second ends;
   a movable armature comprised of at least one permanent magnet having a mass, said armature being substantially free to move within said enclosed volume;
   a first and a second resilient bumper in said enclosed volume and contactable with said first and said second ends, respectively;
   a coil structure for inducing a magnetic field substantially throughout said housing, located substantially between said first and said second ends of said enclosed volume and substantially adjacent to said cylindrical housing.

2. The impulse transducer of claim 1 where said first resilient bumper is located at and coupled to a first end of said housing.

3. The impulse transducer of claim 1 where said second resilient bumper is located at and coupled to a second end of said housing.

4. The impulse transducer of claim 1 where said first resilient bumper is coupled to said armature.

5. The impulse transducer of claim 1 where said second resilient bumper is coupled to said armature.

6. The impulse transducer of claim 1 including an additional mass coupled to the permanent magnet.

7. The impulse transducer of claim 1 wherein said permanent magnet is comprised of at least one individual permanent magnet.

8. The impulse transducer of claim 1 wherein the coil structure is wound substantially around said cylindrical housing.

9. The impulse transducer of claim 1 wherein the coil structure is wound substantially within said cylindrical housing.

10. The impulse transducer of claim 1 wherein the housing is made of a material sufficient to allow a magnetic field to permeate through it.

11. The impulse transducer of claim 1 wherein the first and second bumpers are comprised of a compliant material having a durometer substantially between 20 and 100.

12. The impulse transducer of claim 1 further comprised of a spring coupled to one side of said movable armature and to at least one of said first and second resilient bumpers.

13. The impulse transducer of claim 1 wherein said at least one permanent magnet is comprised of samarium cobalt.

14. The impulse transducer of claim 1 wherein said at least one permanent magnet is comprised of neodynium.

15. The impulse transducer of claim 1 wherein said at least one permanent magnet is comprised of an alnico alloy.

16. A radio communications device comprising:
radio signal detector means for receiving radio signals;
message detector means, coupled to said radio signal detector means, for detecting an addressed message within said radio signals;
an impulse transducer announcing receipt of a message comprised of:
a housing having an enclosed substantially cylindrical volume, said enclosed volume having first and second ends;
a movable armature comprised of at least one permanent magnet having a mass, said armature being substantially free to move within said enclosed volume;
a first resilient bumper located at a first end of said housing and a second resilient bumper located at a second end of said housing, both bumpers being in said enclosed volume; and
a coil structure for inducing a magnetic field substantially throughout said housing, located substantially between said first and said second ends of said enclosed volume and substantially adjacent to said enclosed volume.

17. The impulse transducer of claim 16 including an additional weight coupled to the at least one permanent magnet.

18. The impulse transducer of claim 16 wherein said at least one permanent magnet is comprised of at least one individual permanent magnet.

19. The impulse transducer of claim 16 wherein the coil structure is wound substantially around the exterior of said housing.

20. The impulse transducer of claim 16 wherein the coil structure is wound substantially within said housing.

21. The impulse transducer of claim 16 wherein the housing comprises a material sufficient to allow a magnetic field to permeate through it.

22. The impulse transducer of claim 16 wherein the first and second bumpers are comprised of a compliant material having a durometer substantially between 20 and 100.

23. The impulse transducer of claim 16 further comprised of a spring coupled to one side of said movable armature and to at least one of said first and second resilient bumpers.

24. The impulse transducer of claim 16 wherein said at least one permanent magnet is comprised of samarium cobalt.

25. The impulse transducer of claim 16 wherein said at least one permanent magnet is comprised of neodynium.

26. The impulse transducer of claim 16 wherein said at least one permanent magnet is comprised of an alnico alloy.

27. A radio communications device comprising:
radio signal detector receiving radio signals;
message detector coupled to said radio signal detector means, detecting an addressed message within said radio signals;
an impulse transducer announcing receipt of a message comprised of:
a housing having an enclosed substantially cylindrical volume, said enclosed volume having first and second ends;
a movable armature comprised of at least one permanent magnet having a mass, said armature being substantially free to move within said enclosed volume;
a first resilient bumper located at a first end of said housing;
a second resilient bumper located a first distance from said first resilient bumper at a second end of said housing;
magnetic field means comprising a coil structure for inducing a magnetic field substantially throughout said housing, located substantially between said first and said second ends of said enclosed volume and substantially adjacent to said enclosed volume.

* * * * *